Sept. 26, 1950  O. E. SZEKELY  2,523,928
COUPLING

Filed Oct. 30, 1947  3 Sheets-Sheet 1

INVENTOR.
OTTO E. SZEKELY
BY
*Busser Harding*
ATTORNEYS

Sept. 26, 1950     O. E. SZEKELY     2,523,928
COUPLING
Filed Oct. 30, 1947     3 Sheets-Sheet 2
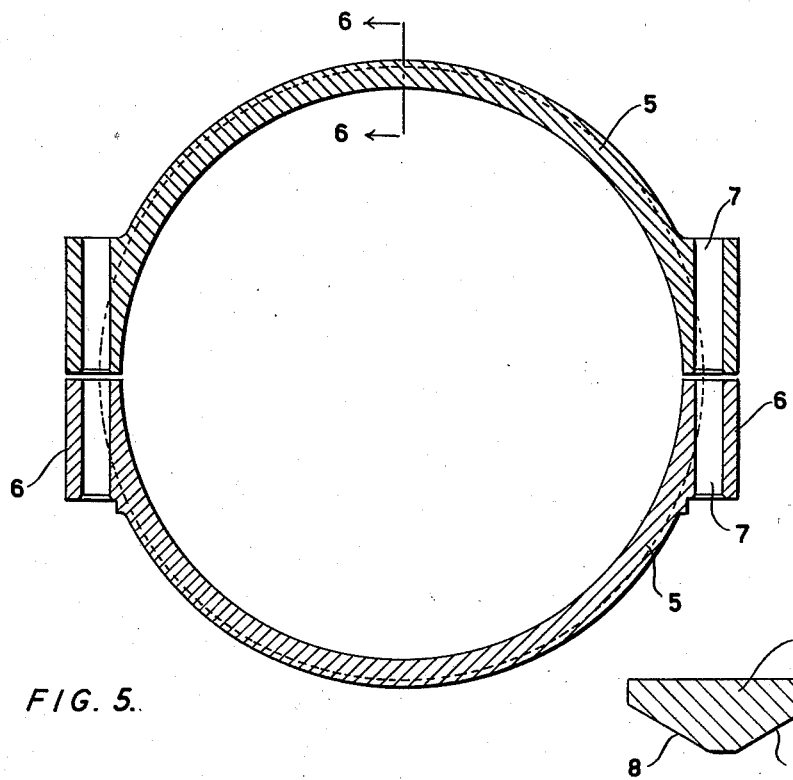
FIG. 5.
FIG. 6.
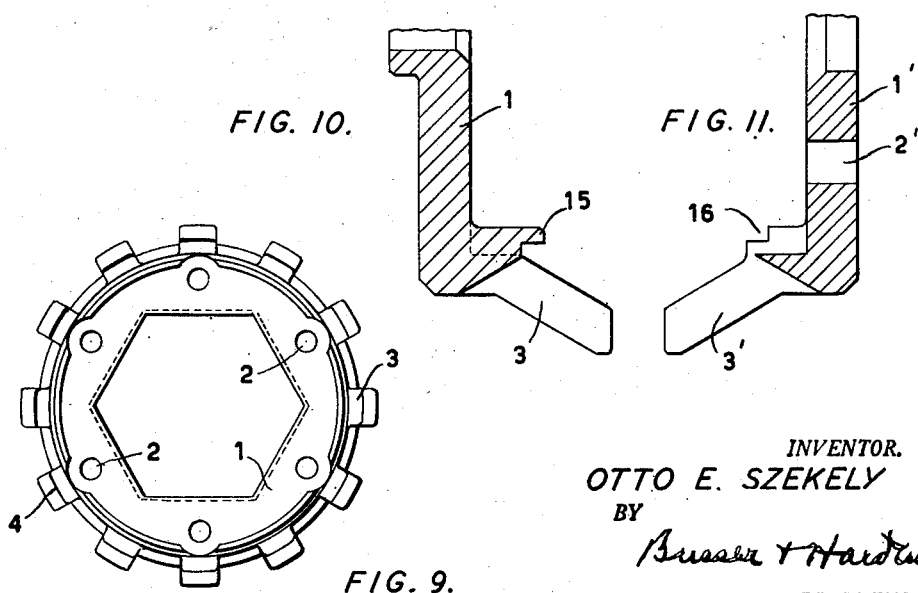
FIG. 10.     FIG. 11.
FIG. 9.
INVENTOR.
OTTO E. SZEKELY
BY
*Busser + Harding*
ATTORNEYS Sept. 26, 1950 O. E. SZEKELY 2,523,928
COUPLING
Filed Oct. 30, 1947 3 Sheets-Sheet 3
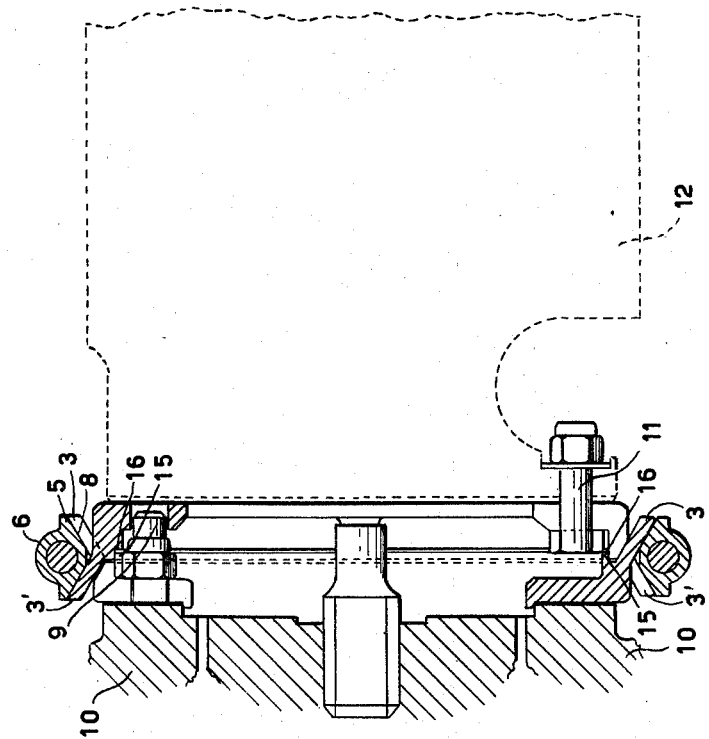
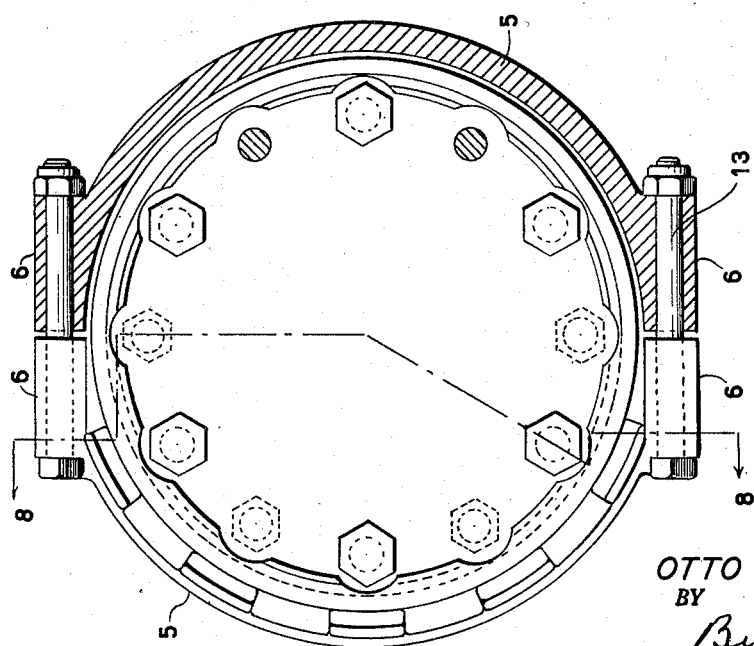
INVENTOR.
OTTO E. SZEKELY
BY
Busser & Harding
ATTORNEYS Patented Sept. 26, 1950

2,523,928

UNITED STATES PATENT OFFICE 2,523,928

COUPLING

Otto E. Szekely, Philadelphia, Pa., assignor, by mesne assignments, to O. E. Szekely & Associates, Inc., Philadelphia, Pa., a corporation of Pennsylvania Application October 30, 1947, Serial No. 783,039

1 Claim. (Cl. 285—129)

This invention relates to a novel coupling and more particularly to one so constructed as to form a positive connection and, at the same time, as to be quickly connected and disconnected.

The coupling according to this invention is of simple construction and is in various forms and applied to various uses as, for example, in the mounting of one element on another, as, for example, of an accessory, as a generator, starter, or the like, on an internal combustion engine; or, as a further example, the making of a driving connection between, for example, a driven shaft and an element to be driven.

The coupling according to this invention comprises, broadly speaking, a pair of complementary elements each having a plurality of spaced fingers extended at an angle, the fingers of the respective elements being adapted to interlock and when interlocked to present, due to their angularity, a plurality of angularly opposed surfaces; and a locking element provided with a pair of angularly opposed surfaces corresponding to the angularly opposed surfaces presented by the interlocked fingers and adapted to engage and exert a cam action upon such surfaces whereby the elements are secured together.

Having now indicated, in a general way, the nature and purpose of this invention, I will proceed to a detailed description of an embodiment thereof with reference to the accompanying drawings in which:

Figure 5 is a sectional view of a locking element.

Figure 6 is a sectional view on line 6—6, Figure 5.

Figure 7 is a plan view, partly in section, of complete coupling according to this invention.

Figure 8 is a sectional view on line 8—8, Figure 7.

Figure 9 is a plan view of a modified form of coupling embodying this invention.

Figure 10 is a fragmentary view, partly in section, of the element shown in Figure 1.

Figure 11 is a fragmentary view, partly in section, of the element shown in Figure 3.

Figure 2:
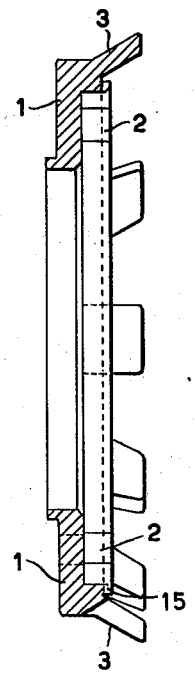
Figure 2 is a sectional view on line 2—2, Figure 1.
Figure 1:
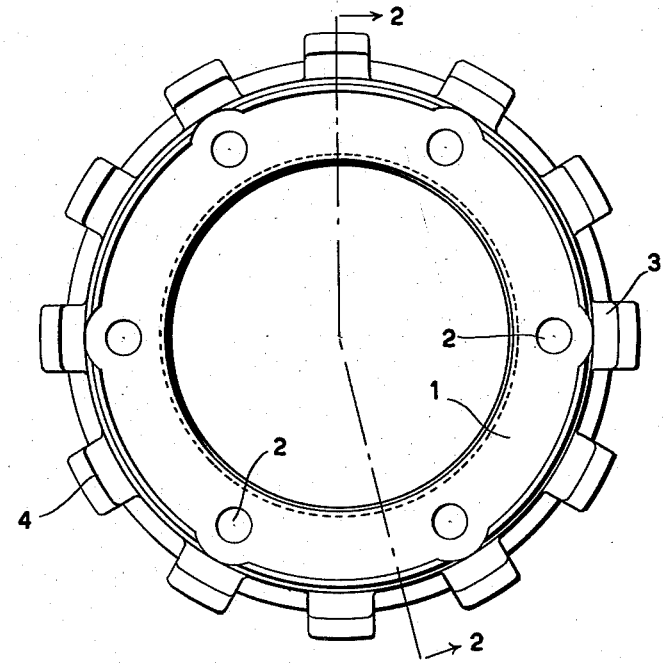
Figure 1 is a plan view of one of the complementary elements of a coupling according to this invention.

The element illustrated by Figures 1 and 2 comprises a flange 1, drilled as at 2, 2 for attachment by means of bolts, and provided peripherally with a plurality of uniformly spaced fingers 3, 3. The fingers 3, 3 extend from the flange 1 at an angle and respectively present surfaces 3', 3' extending at an angle, say, for example, an angle of 75°, to the plane of the flange 2. As shown in Figure 10 the flange 1 is provided with an annular flange or pilot 15.

Figure 3:
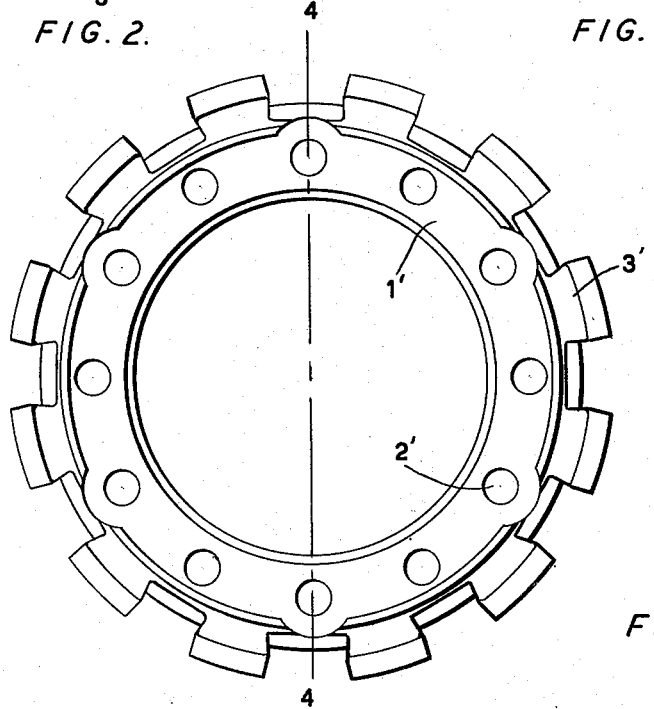
Figure 3 is a plan view of the second of the complementary elements of a coupling according to this invention.
Figure 4:
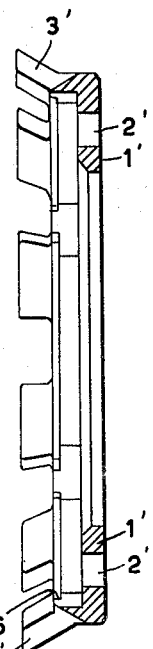
Figure 4 is a sectional view on line 4—4, Figure 3.

The element illustrated by Figures 3 and 4 is complementary to the element illustrated by Figures 1 and 2 and comprises a flange 1', drilled as at 2', 2' for attachment by means of bolts, and provided peripherally with a plurality of uniformly spaced fingers 3', 3', extending from the flange 1' at an angle and respectively presenting surfaces 4', 4' extending at an angle of say, for example, 75° to the plane of the flange 1'. The fingers 3', 3', in distinction from the fingers 3, 3, Figures 1 and 2, are tapered outwardly in their extension from root to tip, say, for example, on an angle of about 15°.

The flange 1' is provided with a recess 16 adapted to receive the flange or pilot 15 on flange 1'.

The fingers 3, 3, Figures 1 and 2, and the fingers 3', 3', Figures 3 and 4, are of a width and spacing such that they may be interlocked with their respective surfaces 4, 4 and 4', 4', in opposed angular relationship.

By virtue of the tapering of the fingers 3', 3', the fingers of the two elements are interlocked by axial movement of the elements and will remain interlocked except against axial movement of the elements. As a consequence, for example, in mounting a generator, as shown in Figure 8, when the fingers are interlocked, the generator cannot fall and needs no support while the locking ring is placed and secured.

The locking element illustrated in Figures 5 and 6 comprises a pair of semi-circular members 5, 5 provided with bosses 6, 6, drilled as at 7, 7 for the passage of bolts for securing the members together. The members 5, 5 as shown in Figure 6, are formed with interior angularly extending cam surfaces 8, 8 complementary to the surfaces 4, 4 and 4', 4' of the fingers 3, 3 and 3', 3'.

In practice for, by way of illustration, the mounting of a generator on an engine base, as illustrated by Figures 7 and 8, the flange 1 is secured by bolts 9 to a motor base 10, and the flange 1' is secured to a generator 12, indicated by dotted lines, Figures 7 and 8. The fingers 3, 3 and 3', 3' are then interlocked, axial alignment of the generator shaft with the drive shaft being insured by the entry of the flange or pilot 15 on flange 1 into the recess 16 in flange 2, and the semi-circular members 5, 5 positioned within the cam surfaces 8, 8 in engagement with the surfaces 4, 4 and 4', 4' presented by the fingers 3, 3 and 3', 3'. The members 5, 5 are then drawn together and secured by means of bolts 13 passed through the bosses 6, 6. It is again noted that by virtue of the taper of fingers 3', 3', the generator need not be supported while the locking collar is being placed and secured.

As will now be apparent, the members 5, 5 act to draw and hold the flanges 1, 1', respectively secured to the engine base and generator, together through the cam action of the members 5, 5 on the interlocked fingers 3, 3 and 3', 3'.

As will be apparent, the generator will be dismounted by releasing bolts 13, removing members 5, 5 and withdrawing the fingers 3, 3 and 3', 3' from their interlocked relationship.

Referring now to Figure 8, it will be appreciated that the structure of the several elements is the same as described above except that the flanges 1 and 1' are provided with angular apertures, for example, six sided as shown, rather than circular. It will, of course, be appreciated that the angular apertures in the flanges 1, 1' may be other than six sided, as, for example, octagonal or square.

As will be apparent, the several elements of the coupling according to this invention may be fabricated from any suitable material, such as iron, steel, aluminum, ferrous and non-ferrous alloys, with consideration for the particular use for which any given embodiment is intended.

What I claim and desire to protect by Letters Patent is:

A coupling comprising a pair of complementary members each provided with spaced fingers extending from an end thereof at an acute angle to a plane vertical to the axes of said members, said fingers being adapted to be interlocked to present angularly extending surfaces in staggered relation, the fingers extending from one of said complementary members being of greater width at their tips than at their roots, the fingers extending from the other complementary member, each being in their extension from root to tip of substantially the same contour as the contour of the corresponding spaces between the fingers extending from the first said complementary member, and a locking member adapted to engage the angularly extending surface presented by said interlocked fingers, the interlocking action being such that a slight relative tilting of the complementary members will securely bind them together.

OTTO E. SZEKELY.

REFERENCES CITED

The following references are of record in the file of this patent:

UNITED STATES PATENTS

| Number | Name | Date |
|---|---|---|
| 1,263,252 | Jencick | Apr. 16, 1918 |
| 1,882,616 | Hutchinson | Oct. 11, 1932 |
| 1,909,297 | Merrill | May 16, 1933 |
| 2,439,161 | Du Bois | Apr. 6, 1948 |